United States Patent
Thompson

(10) Patent No.: US 11,788,838 B2
(45) Date of Patent: Oct. 17, 2023

(54) BIODEGRADABLE GROUND CONTROL TARGET

(71) Applicant: Brendan Thompson, Denver, CO (US)

(72) Inventor: Brendan Thompson, Denver, CO (US)

(*) Notice: Subject to any disclaimer, the term of this patent is extended or adjusted under 35 U.S.C. 154(b) by 271 days.

(21) Appl. No.: 17/384,725

(22) Filed: Jul. 24, 2021

(65) Prior Publication Data
US 2022/0034657 A1  Feb. 3, 2022

Related U.S. Application Data

(60) Provisional application No. 63/058,919, filed on Jul. 30, 2020.

(51) Int. Cl.
| | | |
|---|---|---|
| *G01C 15/06* | (2006.01) | |
| *G01S 7/48* | (2006.01) | |
| *G01C 15/02* | (2006.01) | |
| *G01C 15/00* | (2006.01) | |
| *G01C 11/00* | (2006.01) | |
| *B64F 1/18* | (2006.01) | |

(52) U.S. Cl.
CPC .......... *G01C 15/06* (2013.01); *B64F 1/18* (2013.01); *G01C 11/00* (2013.01); *G01C 15/00* (2013.01); *G01C 15/02* (2013.01); *G01S 7/4802* (2013.01)

(58) Field of Classification Search
CPC ........ G01C 15/06; G01C 15/00; G01C 15/02; G01C 11/00; G01S 7/4802; B64F 1/18
See application file for complete search history.

(56) References Cited

U.S. PATENT DOCUMENTS

| | | | | |
|---|---|---|---|---|
| 1,219,454 A | * | 3/1917 | Hanson ................. | E04H 13/003 52/103 |
| 1,558,078 A | * | 10/1925 | Darby ..................... | A63B 57/40 52/103 |
| 2,181,032 A | * | 11/1939 | Watkins ................. | G01C 15/06 52/103 |
| 3,321,834 A | * | 5/1967 | Burns ....................... | E02F 1/00 33/293 |
| 3,428,019 A | * | 2/1969 | Tillay ........................ | B64F 1/18 340/981 |
| 4,185,424 A | * | 1/1980 | Streit ..................... | G01C 15/04 52/153 |
| 4,261,283 A | * | 4/1981 | Taylor ..................... | B64D 1/02 40/216 |
| 4,474,349 A | * | 10/1984 | Loeckle .................. | B64D 1/00 221/33 |

(Continued)

OTHER PUBLICATIONS

EP-1220184-A2; Shmedes, "Marker for Charts", Jul. 2002. (Year: 2002).*

(Continued)

*Primary Examiner* — John Fitzgerald
*Assistant Examiner* — Tania Courson
(74) *Attorney, Agent, or Firm* — Leyendecker & Lemire

(57) ABSTRACT

A generally rigid ground control target preferably fabricated from a biodegradable or compostable material and optionally include a biodegradable securing stake is described. In one variation of the ground control target scored or perforated sections are provided including a center portion thereof that are selectively removable to convert the target into a stencil for use in applying painted targets directly on a ground surface.

16 Claims, 6 Drawing Sheets

(56) References Cited

U.S. PATENT DOCUMENTS

| | | | | |
|---|---|---|---|---|
| 4,625,473 | A * | 12/1986 | Peterson | G01C 15/04 52/103 |
| 4,738,060 | A * | 4/1988 | Marthaler | E04H 12/223 52/153 |
| 4,970,795 | A * | 11/1990 | Woodward | G01C 15/04 52/103 |
| D395,251 | S * | 6/1998 | Truax | D10/66 |
| 6,415,734 | B1 * | 7/2002 | LaPuzza | G01C 15/02 428/181 |
| 6,578,512 | B2 * | 6/2003 | Truax | G01C 15/04 52/103 |
| 6,997,334 | B2 * | 2/2006 | Manix | A45F 5/00 211/89.01 |
| 7,685,961 | B2 * | 3/2010 | Truax | G01C 15/04 52/103 |
| 8,206,057 | B2 * | 6/2012 | Setzer | G09F 13/20 404/9 |
| 8,966,774 | B2 * | 3/2015 | Choi | G01C 15/04 33/1 G |
| 10,905,212 | B2 * | 2/2021 | Song | A45C 11/34 |
| 11,719,538 | B2 * | 8/2023 | Tecu | G01B 3/1048 33/293 |
| 2003/0009516 | A1 * | 1/2003 | McGillivray | B65D 5/4204 709/203 |
| 2004/0031214 | A1 * | 2/2004 | Fong | G01C 15/04 52/103 |
| 2006/0007452 | A1 * | 1/2006 | Gaspard | G01C 11/00 382/103 |
| 2019/0204417 | A1 * | 7/2019 | Thompson | G01S 7/4802 |
| 2021/0341630 | A1 * | 11/2021 | San Miguel | G01S 19/45 |

OTHER PUBLICATIONS

WO-2012031576-A1; Danz, "Display Unit With Photovoltaic Power Generation", Mar. 2012. (Year: 2012).*

* cited by examiner

BIODEGRADABLE GROUND CONTROL TARGET

RELATED APPLICATIONS

This application claims priority to and incorporates fully by reference U.S. Provisional Application No. 63/058,919 filed on Jul. 30, 2020 having the same title and inventorship as the present application.

BACKGROUND

Ground control targets are used for mapping an area aerially typically utilizing drones. These points are to mark known reference locations that permit a drone to map an area accurately ascertaining the positioning of features and topography of the land being surveyed.

Ground control targets can comprise physical targets or targets painted on the underlying surface. In a typical mapping scenario many ground control targets (20 or more depending on the size and topography of the area being mapped) can be utilized and are typically placed about every 800-2550 feet. Placing the targets can be time consuming especially if the area being mapped is large and/or the terrain is rugged.

In the current prior art, ground control targets are typically made of thin and flexible PVC sheeting. Because this sheeting is prone to being blown in the wind, it has to be secured with four or more large and relatively heavy nails around its perimeter increasing placement time. Furthermore, because the thin sheeting is prone to ripping at the nail and/or setting pin insertion points, especially when buffeted and blown by the wind, the target is not secured at the survey critical center point of the ground control target. Accordingly, as can be appreciated, the center point of the ground control targets can be raised several inches off the surface of the underlying ground by plant material underneath and or wind causing the center of the target to puff up. Without a well-defined center, inaccuracies in the resulting survey can result. Further, if the wind causes the plastic sheet ground control target to tear and break free of one or more of the nails, a surveyor may need to place the ground control target often in the middle of a drone surveying operation adding substantially to time and cost.

As can be appreciated, retrieval of physical targets after the mapping has been completed can also be very time consuming. Because of this targets, which are typically comprised of a plastic sheet, are left in place by surveying crews effectively becoming plastic pollution. As can be appreciated, the multiple setting nails (usually steel) and plastic sheeting can take many, if not hundreds of years, to decompose.

While painted ground control targets avoid the retrieval and little problems of the ground control targets comprised of plastic sheet, they often have drawbacks as well. For instance, the edges of stenciled ground control targets may not be as crisp or well defined as desired especially when the underlying substrate is dirt or vegetation resulting in reduced accuracy. Further the local topography at the location where a ground control targets is to be placed can hinder the use of a painted target.

DETAILED DESCRIPTION

Figure 1:
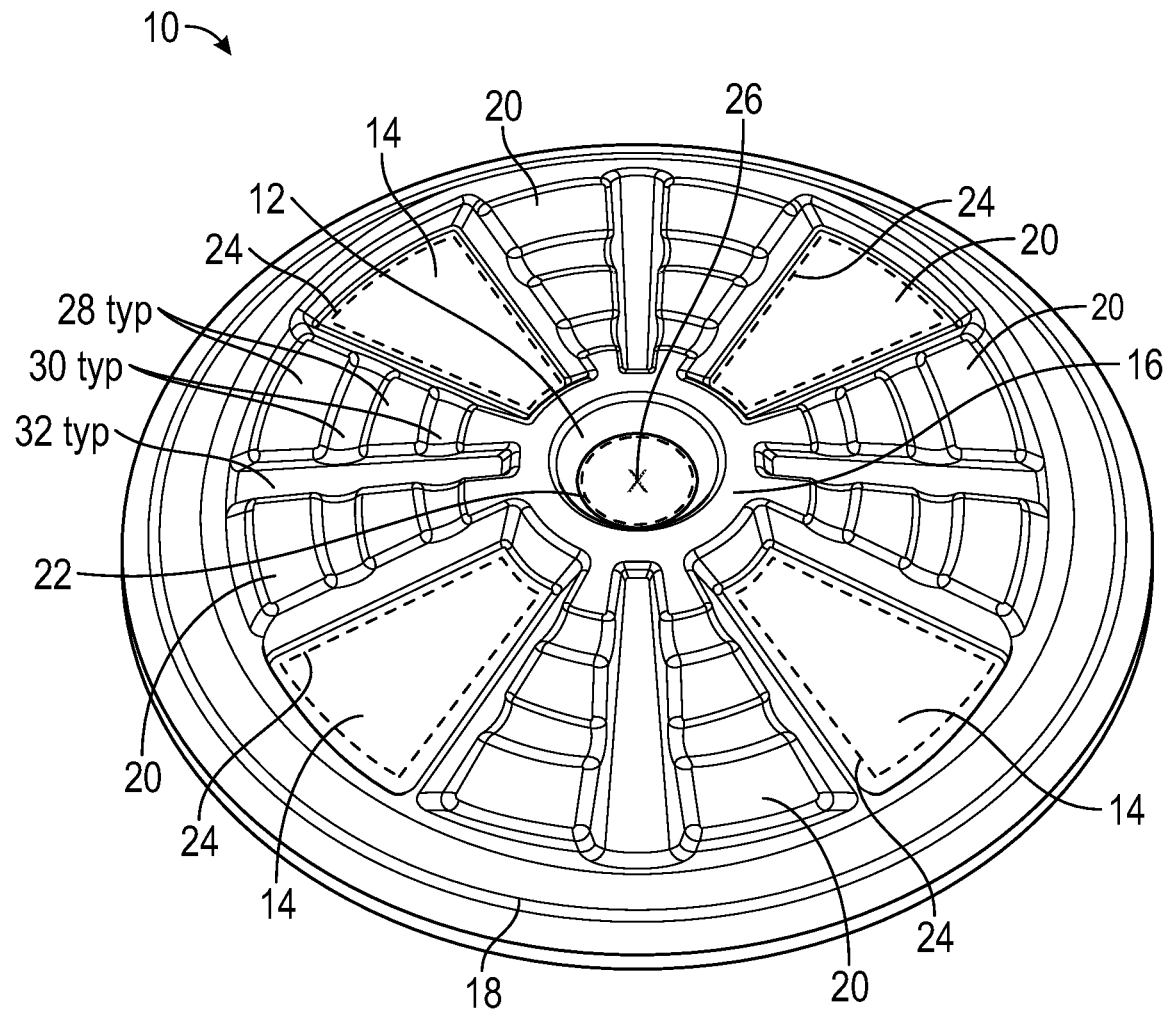
FIG. 1 is a perspective top view of a ground control target according to an embodiment of the present invention.

Embodiments of the present invention comprise a ground control target preferably fabricated from a biodegradable or compostable material and optionally include a biodegradable securing stake. In one variation of the ground control target scored or perforated sections are provided including a center portion thereof that are selectively removable to convert the target into a stencil for use in applying painted targets directly on a ground surface.

Embodiments of the ground control targets replace the use of prior art ground control points made of sheet material and offer one or more potential advantages over the prior art. Significantly, embodiments of the ground control target fabricated from a biodegradable material, and even more significantly a rapidly biodegrading material, eliminate the need to pick up the targets after use. Rather, they can remain in place with minimal deleterious environmental impact on the surveyed ground. This significantly reduces the costs of responsible survey companies from having to send human resources back on to the land after the drone mapping has been completed to remove the targets and their associated securing nails. Further, those companies and crews that tend to leave the prior art targets in place will no longer risk possible fines for polluting and/or loss of future business when their polluting behavior becomes known.

The target is molded in a three dimensional shape that is generally convex having a greatest height along an inner ring raised portion generally proximate the target's center or middle and descending in height towards its outer edge. The target is further defined by several raised and depressed portions that act to give the target comprised of relatively thin biodegradable or compostable material rigidity and stiffness. The various depressions and raised portions further act to make the target more visible to an aerial observer, such as a drone. Furthermore, depressed annulus sector and center depressed portions that are perforated along a floor or bottom wall permit removal of the floor to create a stencil that can be used to paint targets on surfaces where the placement of the target is inconvenient or not possible.

The targets are generally stackable and as such can be packaged in stacked form in specially configured boxes with cutouts that permit the box to be easily carried and permit targets to be individually dispensed from the box. Some variations of the box further include locations wherein stakes (also referred to as and used interchangeably with "pins", "fastening pins" or "nails" herein) can be received so that they can also be conveniently transported with the targets.

Terminology

The terms and phrases as indicated in quotation marks (" ") in this section are intended to have the meaning ascribed to them in this Terminology section applied to such term throughout this document—including in the claims—unless clearly indicated otherwise in context. Further, as applicable, the stated definitions are to apply, regardless of the word or phrase's case, to the singular and plural variations of the defined word or phrase.

The term "or," as used in this specification and the appended claims, is not meant to be exclusive—rather the term is inclusive, meaning either or both.

References in the specification to "one embodiment," "an embodiment," "another embodiment," "a preferred embodiment," "an alternative embodiment," "one variation," "a variation," and similar phrases mean that a particular feature, structure, or characteristic described in connection with the embodiment or variation, is included in at least an embodiment or variation of the invention. The phrase "in one embodiment," "in one variation," or similar phrases, as used in various places in the specification, are not necessarily meant to refer to the same embodiment or the same variation.

Directional and relationary terms such as, but not limited to, left, right, nadir, apex, top, bottom, vertical, horizontal, back, front, longitudinal, and lateral are relative to each other and are dependent on the specific orientation of a applicable element or article, and are used accordingly to aid in the description of the various embodiments and are not necessarily intended to be construed as limiting. For instance, traffics signals are known in which the various signal lights are mounted horizontal to each other instead of the more common vertical orientation. The vertically-orientated traffic signal is illustrated herein but it is to be understood that versions and embodiments of the present invention can be used with horizontally orientated traffic signals as well.

The term "about," as used in this specification and appended claims, refers to plus or minus 20% of the value given.

The term "approximately," as used in this specification and appended claims, refers to plus or minus 10% of the value given.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The terms "generally" and "substantially," as used in this specification and appended claims, mean mostly, or for the most part.

As used herein, the phrase "ground control target" refers to an article placed or created on a ground surface to indicate a particular location that is resolvable from the air by aircraft, which typically, but not necessarily, comprises a drone.

As used herein, the word "biodegradable" refers to a property of an associated material wherein the material degrades or decomposes into innocuous products through exposure to the environment by way of living organisms acting on the material. The living organisms include plants, fungi, molds, bacteria, and other microorganisms.

As used herein the phrase "biodegradable material" refers to a material that is biodegradable within a timespan of two years once exposed to the environment and the living organisms present therein that act to decompose the material.

As used herein the phrase "biodegradable plastic" refers to a plastic that is biodegradable within a timespan of five years once exposed to the environment and the living organisms present therein that act to decompose the material.

As used herein the term "compostable" refers to an item or material that meets ASTM standard for compostability. Specifically, ASTM D6400 pertains to the compostability of products made from plastic. Embodiments of the fastening pin described herein are made of a plastic that conforms with the ASTM D6400 standard. ASTM D6868 concerns the compostability paper products that incorporate a plastic film. Some embodiments of the ground target are made from materials meeting this standard.

As used herein, the term "convex" refers to an article that is outwardly curved or rounded like the exterior of a sphere or circle. The phrase "generally convex" refers to an article that overall has a convex shape but may also include changes in shape and/or topography at certain localized portions of thereof that are not convex. For example, a plate like-structure having an outer surface is a higher center point that on average descends radially to a lower perimeter thereof would be "generally convex" even with the presence of depressed or raised portions on and along the outer surface.

An Embodiment of a Ground Control Target

Figure 2:
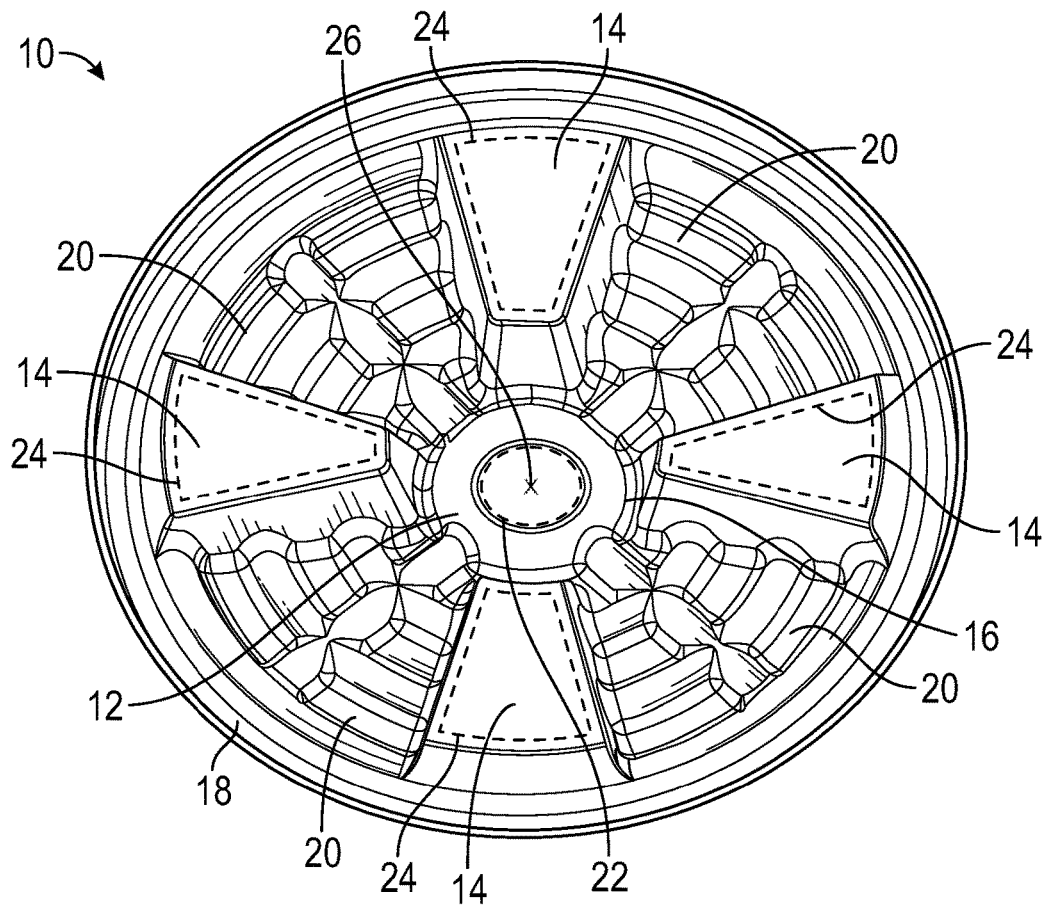
FIG. 2 is a perspective bottom view of the ground control target according to an embodiment of the present invention.

FIGS. 1 and 2 illustrate an embodiment of a ground control target 10 for use in surveying particularly when utilizing aerial drones. The target is unitary and comprises one or both of a biodegradable and compostable martial, such as but not limited to, paper and animal dung. The illustrated embodiment is round and has a diameter of about 10", although variations may comprise other shapes, such as square or triangular, in differing sizes.

Typically, the target is molded such that the target has a generally uniform wall thickness; however, the surface of the target is characterized by a series of raised and depressed portions 12-20 creating a three dimensional topography on the top surface thereof that can have a generally convex surface profile. The three dimensional configuration serves multiple purposes. First, the raised portions 16, 18, 20 define a plurality of depressed portions 12, 14 wherein the raised and depressed portions help define and point to the center 26 of the target. The depressed portions are easily differentiated over the raised portions by the drone's optics helping ensure accurate survey results.

Second, the raised and depressed portions 12-20 dramatically increase the stiffness of the target 10 while permitting it to remain extremely lightweight especially when compared to targets made of sheet plastic, which have effectively little to no stiffness or rigidity, and targets made of flat card stock of a similar sheet or wall thickness. The rigidity means that the targets can be secured to the ground with a single spike, nail or pin, typically at a center point 26, without the risk or concern that the target will be flipped, bent or otherwise misshapen by environmental forces, such as wind, before the associated aerial survey is performed.

Third, the intersection of certain depressed portions 12, 14 and raised portions 16, 18, 20 create intersections 22 & 24 at which the floors of the depressed portions can be more cleanly torn and/or cut from the remainder of the target to create a stencil that can be used as templates in the application of painted targets on a ground surface. As discussed below, these intersections and lines of intersection are usually also scored or perforated to further facilitate selective removal.

Embodiments of the target 10 are made from materials or combinations of materials that are one or both of compostable and biodegradable whereby the targets degrade naturally if left in the field after a survey has been completed. This is in contrast to plastic targets, such as plastic sheeting, that can remain for many years after the survey has been completed unless retrieved by the surveyor. In at least one variation, the target is made in whole or partially from animal dung, particularly fiberous dung, such as from a bovine. The animal dung is typically sterilized prior to use in fabrication. In another variation, the target can be comprised of paper pulp that loses its integrity when exposed to moisture, UV and/or microbes. In at least one variation, the paper pulp is wholly or partially derived from sugarcane. In yet other variations, the dung or pulp can be augmented with seeds, fertilizer, and dormant or active microbes that help facilitate and speed up the decomposition of the target.

With reference primarily to FIG. 1, the topography of the illustrated embodiment will be described. As can be appreciated, the actual configuration of the target as pertaining to the raised and depressed portions can vary significantly and substantially while still imparting advantageous over the prior art. Accordingly, the specific configuration is to be considered illustrative with the acknowledgement that other configurations that also generally embody the principles of the illustrated embodiment are known and contemplated.

A circular center depressed portion 12 is provided in the center of the circular target 10. The center floor of the center depressed portion is substantially flat and is circumscribed by an inner raised ring portion 16. The intersection 22 of the center floor and the inside wall of the raised ring portion is one or both of scored and perforated to make selective removal of the center floor relatively easy. In some variations, the center point 26 of the target and the center depressed portion may also be marked by indicia or a center void or opening may be provided to indicate where a fastening pin, nail or stake is to be driven. The center void at center point 26 can be plus sign or cross shaped to facilitate use with the fastening pin 34 described herein.

Extending substantially radially outwardly from the inner raised ring portion 16 are four each of alternating raised and depressed annulus sector portions 20 & 14. The radial edges of the various annulus sectors all point to the center point of the target. In addition to an inner curved edge abutting the inner raised ring portion, each annulus sector includes an outer curved edge that abuts an outer raised ring portion 18. The outer raised ring portion extends around the circumference of the target proving substantial rigidity to the edge thereof.

Like the center depressed portion 12, each of the four depressed radial annulus sector portions 14 include substantially flat bottoms or floors. The intersections 24 of the edges of each floor with the associated walls of the inner and outer raised ring portions and the walls of neighboring raised radial annulus sector portions are one or both of scored and perforated to make selective removal of the floors relatively easy.

As can be seen in the figures, each of the top faces of the four raised radial annulus sector portions 20 is not flat but has a several alternating minor annular ridges 28 and valleys 30 and includes a radial valley 32 running down its middle. This surface topography serves several purposes: one, it provides additional rigidity and structure to the associated portions and the target has a whole; and two, it provides additional features that make the resolving of the target easier by mapping software analyzing the photographic data from the survey drones.

Figure 3:
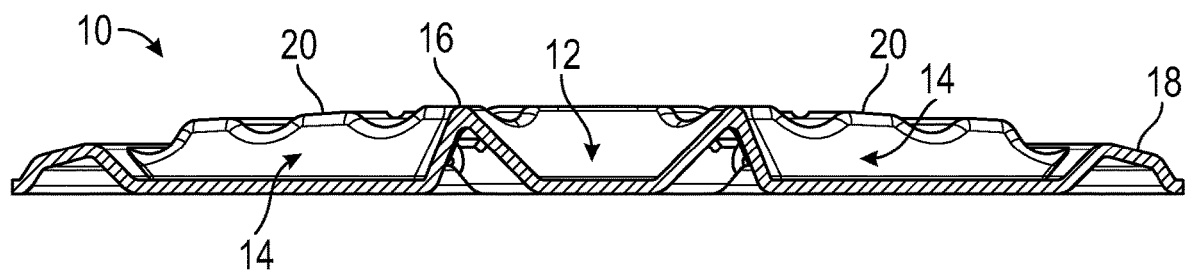
FIG. 3 is a cross section side view of the ground control target of FIG. 1 taken through the center of the target according to an embodiment of the present invention.

With reference to the cross section shown in FIG. 3, the bottom surfaces of the depressed portions 12 & 14, the bottom edges of the inner raised ring 16 and the bottom edges of the outer raised ring 18 are all planar and configured to rest flush against an underlying ground surface during use. As can also be observed from the cross section, the height of the inner raised ring is greater than height of the outer raised ring. Further, the height of the raised radial annulus sector portions 20 gently decrease in height from their intersection with the inner raised ring to their radial edge such that the outside surface of the ground control target is generally convex.

As can be appreciated the particular configuration of the target and its associated combination of raised and depressed portions 12-20 can vary between various embodiments while accomplishing a similar objective of stiffening the target 10 as well as providing resolvable features that will help make subsequent mapping operations, typically performed by software, easier and more accurate. For instance, embodiments are contemplated wherein instead of four depressed annulus sector portions 14 alternating with four raised annulus sector portions 20, there are three raised portions alternating with three depressed portions. The nature of the topography on the faces of the raised annulus sector portions can vary substantially as well such that in some variations the face can be generally flat, convex or concave. Except as specifically claimed, the topography and features of the target are to be considered exemplary and not limiting.

The exterior surface of the target can be painted either a uniform color or two or more contrasting colors to make it more visible to aerial drones and mapping software. The paint can also be of a biodegradable and/or composting type.

An Embodiment of a Biodegradable Fastening Pin for a Ground Control Target

Traditionally, ground control targets 10 are secured to the ground using large nails or stakes. They can be very effective, but suffer from several drawbacks including weight and they fact that they do not quickly decompose. A steel stake can take decades if not centuries to fully corrode and rust away remaining long after an associated target has torn and blown away or preferably decomposed.

Figure 4:
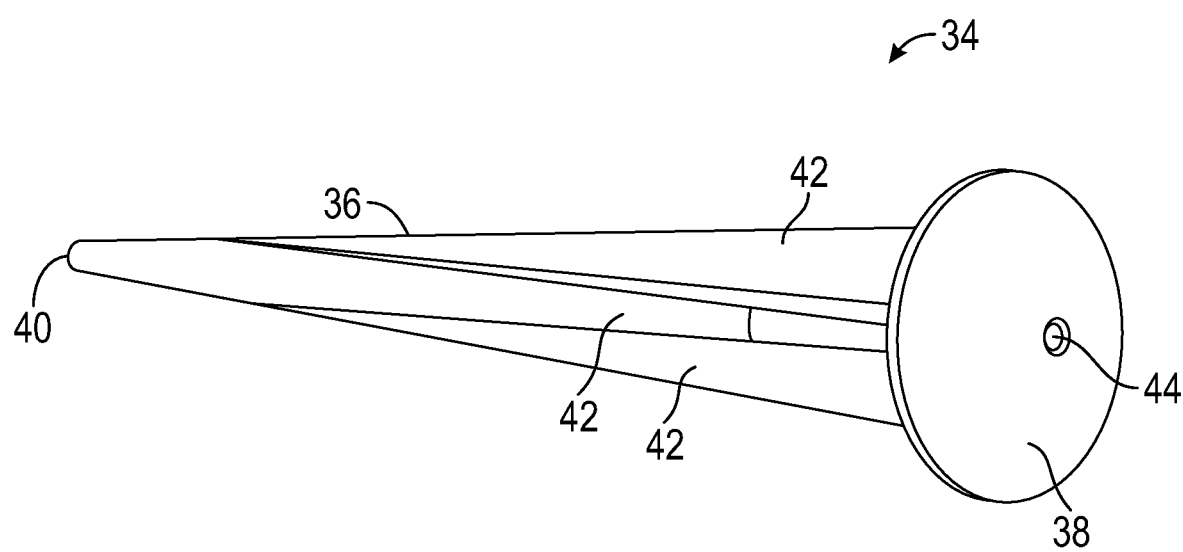
FIG. 4 is a perspective front top view of a fastening pin for use with the ground control target according to an embodiment of the present invention.

FIG. 4 is an illustration of a self-centering fastening pin (or stake) 34 that biodegrades and/or composts minimizing its long term effect on the surrounding environment. The unitary pin comprises a finned tapering shaft 36 and a head 38 located at a top end that is comprised of a rigid plastic that decomposes and or biodegrades with prolonged exposure to the environment. One version of the pin comprises PVA (polyvinyl acetate).

The shaft 36 of the illustrated stake 34 is about 4-8" long although this dimension and the other dimensions of the pin can vary among variations. The shaft tapes from a point or tip 40 at its distal end or tip to a maximum width proximate its proximal end where it intersects with the head 38. The shaft comprises four intersecting fins 42 arranged orthogonally relative to neighboring fins such that the shaft has a cross section resembling a plus symbol. The combination of the taper and the finned configuration of the shaft cause it to shelf center within the center depressed portion 12 of the ground control target if the tip is placed directly over the cross or sign shaped center point 26 and into the correspondingly configured center void on the target. Further, because of the finned configuration the target is resistant to spinning about the shaft, the target 10 maintains its as-placed and as-desired orientation.

The head 38 in the illustrated embodiment is 1" or more in diameter and has a generally convex top surface with a substantially flat bottom surface. Further, a top surface of the head is typically fabricated or painted a contrasting color relative to a target 10. The 1" diameter helps ensure that head is resolved as drone surveying standards in the USA require the minimum resolvable distance to be no larger than 1". A 1" diameter head of a contrasting color is very easily identified during photogrammetric processing of the drone image files ultimately resulting in a more accurate end product.

A indentation or small depression 44 is provided at the center of the head's top. It is sized to receive the pointed end of a survey rod therein allowing a surveyor to center the rod exactly at the center of the pin, and given the pins self-centering capability, also at the center of the target. The head indentation also hinders the end of the rod from slipping during use.

Figure 6:
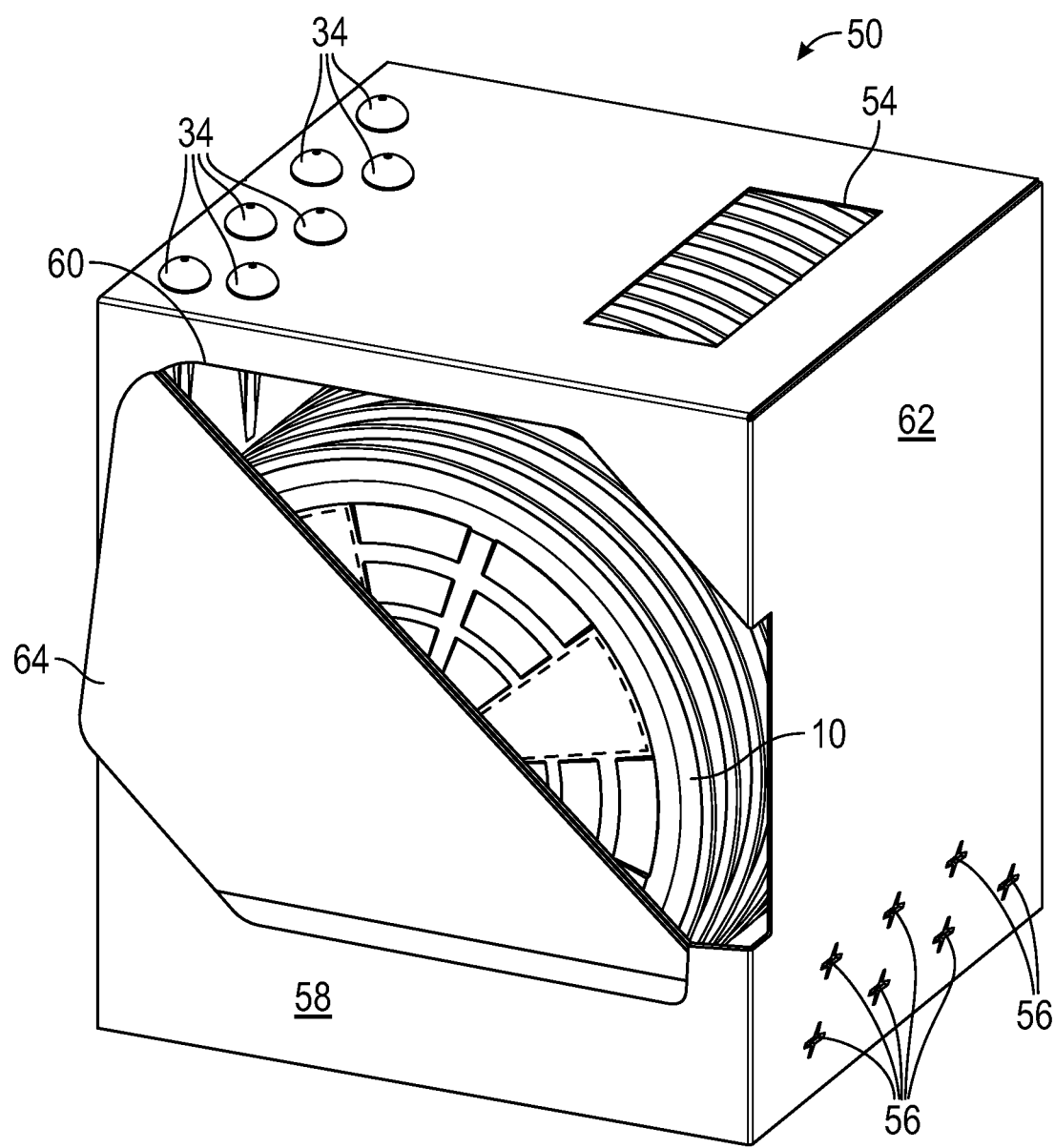
FIG. 6 is a perspective view of a box containing a plurality of stacked ground control targets with an opening created via a cut away section to permit easy transport and dispensing of the targets in the field according to an embodiment of the present invention.
Figure 7:
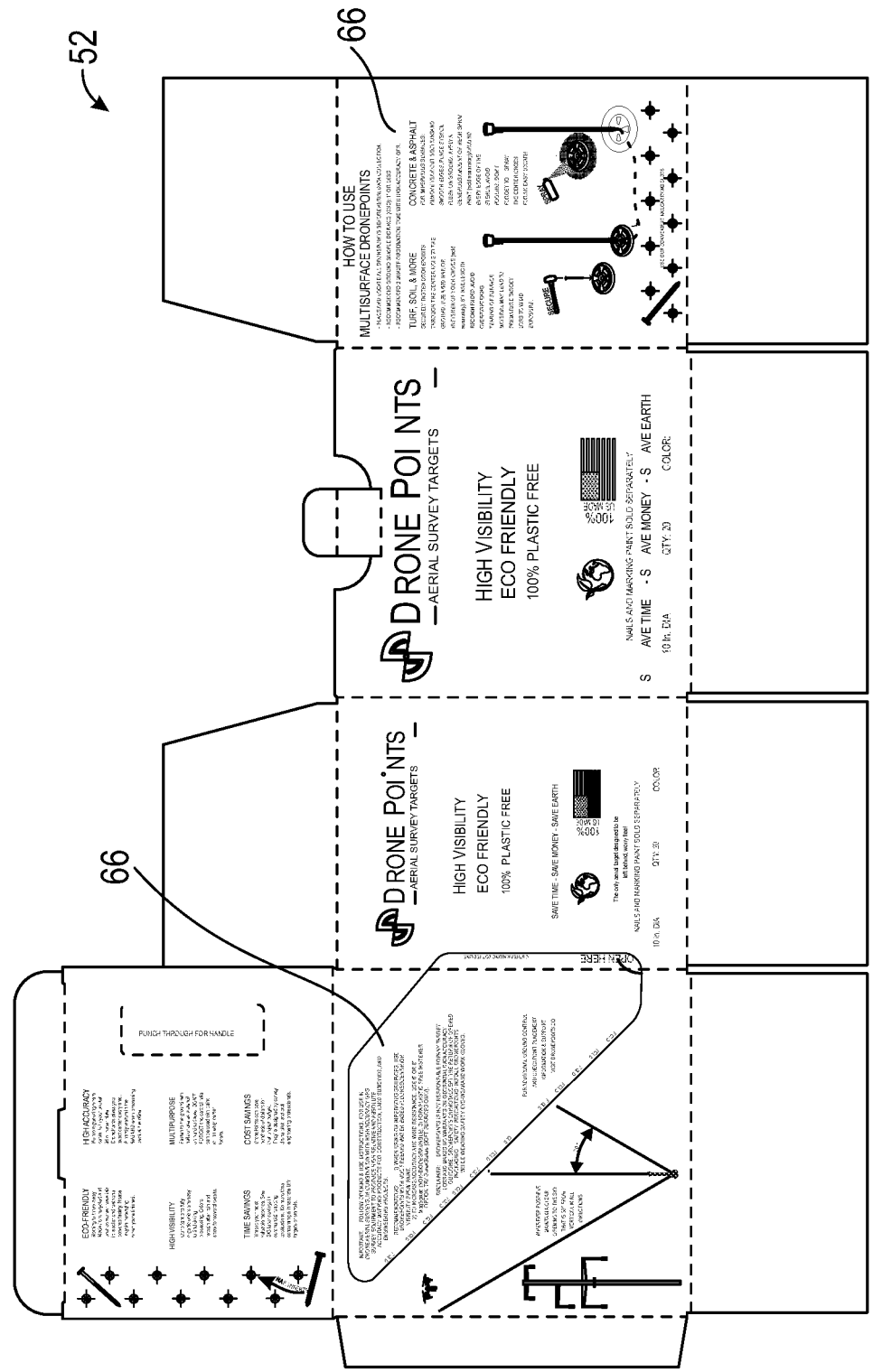
FIG. 7 is a top view of a flat box blank prior to folding along edges and joining the sides to create the three dimensional box structure according to an embodiment of the present invention

An Embodiment of Ground Control Target Packing and Dispensing Container in Combination with a Plurality of Ground Control Targets Contained Therein FIG. 6 is an illustration of a box (or container) 50 used to contain a plurality of ground control targets 10 as well as provide a convenient manner to carry and dispense the targets in the field. FIG. 7 shows a flat blank 52 that once folded and secured creates the box of FIG. 6. The box is typically made of corrugated cardboard although variations made of cardstock, plastic sheeting, and corrugated plastic sheeting are also known. The box serves several purposes. It serves as packaging for a plurality of ground control targets (Qty 20 in the illustrated embodiment) protecting the targets against damage, providing a shipping means and providing a convenient manner to store the targets prior to use. It also provides a convenient manner to carry the targets in the field when placing a plurality of targets at a site to be surveyed. Further, it provides a convenient location to store fastening pins 34 for easy access in the field.

In assembled form, the box 50 typically comprises a cube or a rectangular cuboid. As can be seen a plurality of targets 10 can be vertically stacked in the box. In the illustrated variation the box is about 10.39" tall, 10.38" wide and 8.63" deep permitting it to contain about 20 targets therein. A first cutout is provided on a top side near an edge of the side. When the perforated and/or scored cutout portion is removed, a handle 54 is created through which a user can carry the box around a field site. Along one or more edges of one or more sides one or two rows of slots or holes 56 are provided wherein a user can insert nails or fastening pins 34, so that they do not need to be carried separately and are conveniently located when needed in the field to secure a target. The nails or fastening pins are held in place primarily by gravity and to a lessor extent by friction while the box is being carried by the handle. In some variations of the box, the slots or holes 56 may not be preformed and instead indicia may be printed on the surface of the box indicating where a user can drive a nail or fastening pin into the box without undue concern of damaging the targets contained therein.

Primarily along a first vertical side 58 that is parallel to any targets contained in the container is second cutout 60 is provided. The second cutout is roughly trapezoidal in shape with the longest edge thereof running generally along the diagonal of the first vertical side. One generally vertical edge of the cutout can be contained on an adjacent second vertical side 62 of the box as can be seen in FIG. 6 and is evident on FIG. 7 as well. In use the cutout is separated from the remainder of the vertical sides along three edges creating a flap 64 that remains secured to the box along the diagonal edge. When the flap is folded back, the target closest to the flap in the box can easily be accessed and pulled out of the box through the second cutout opening. As desired the flap can be tucked back over the opening to close it. Alternatively, the cutout can be removed along all four edges and discarded. As can be appreciated, the intact lower portion of the first vertical side and the remaining lip of the first vertical side above the horizontal edge of the second cutout act to retain the targets in the box as it is being carried.

As can be seen in FIG. 7, indicia 66 is typically printed on the surface of several sides of the box blank 52. As mentioned above the indicia can pertain to the locations for locating fastening nails or pins. Indicia can be provided with use instructions for the targets including how to place and secure the target as well as how to use the targets as stencils for spray painting a target on a hard surface, such as concrete.

A Method of Using Embodiments of the Ground Control Targets

A surface is identified on which a ground control target 10 is to be placed. In general, the surface should be relatively flat over at least the diameter of the target. Preferably, the surface should be horizontal. The area surrounding the target site should be free obstruction and provide a clear opening to the sky over a conical space with the vertex of the cone being coincident with the desired center point of the target and having a vertex angle of about 30 degrees. As necessary rock and surface vegetation, such as weeds, can be removed or tamped down.

The target 10 is placed on the desired surface and the point/tip 40 of a nail or fastening pin 34 is placed against the center point 26 of the target. As indicated indicia indicating the center point can be provided on the target in the center of the center depressed portion. The nail/pin is then driven into the underlying ground typically with a mallet. If the fastening pin 34 described above is utilized, the fins 42 of the shaft cut slits into the surrounding floor of the center depressed portion 12 and act to also secure the target rotationally.

Once in place the target 10 can be used to assist in the survey of the associated site. Typically, a ground survey crew will establish the exact coordinates of the target center using any suitable known methods. Typically, a surveying post which may have a GPS receiver attached to it is centered on the center of the target and the associated coordinates are acquired. If the fastening pin 34 described above is utilized, the tip of the surveying post can be place in the dimple 44 in the center of the pin's head 38, which hinders the post from sliding side to side and ensures it is properly centered.

After the coordinates of the various targets are determined, a drone survey is conducted wherein the targets are captured in image data for the survey site and used by associated mapping software to create an accurate survey plot.

When using plastic or other non-biodegradable or compostable targets, it is desirable to send a person out to recover the various target and associated nails used to secure the targets. However, with the present target 10, especially when used with the described fastening pins 34, the targets can be left in place to one or both of degrade and compost becoming part of the soil and associated ecosystem.

A Method of Applying a Painted Ground Control Target on a Ground Surface

Securing a ground control target 10 to a hard surface, such as asphalt and concrete is not practicable or desirable in most situations since a nail or fastening pin 34 may not be capable of being driven into such a surface. Furthermore even if nails can be driven into these surfaces, the holes and potential associated cracking can cause premature degradation due to water infiltration and associated freeze and thaw cycle. In these situations, it is recommended a target be painted on the underlying surface using a water-based fluorescent or neon paint.

Figure 5:
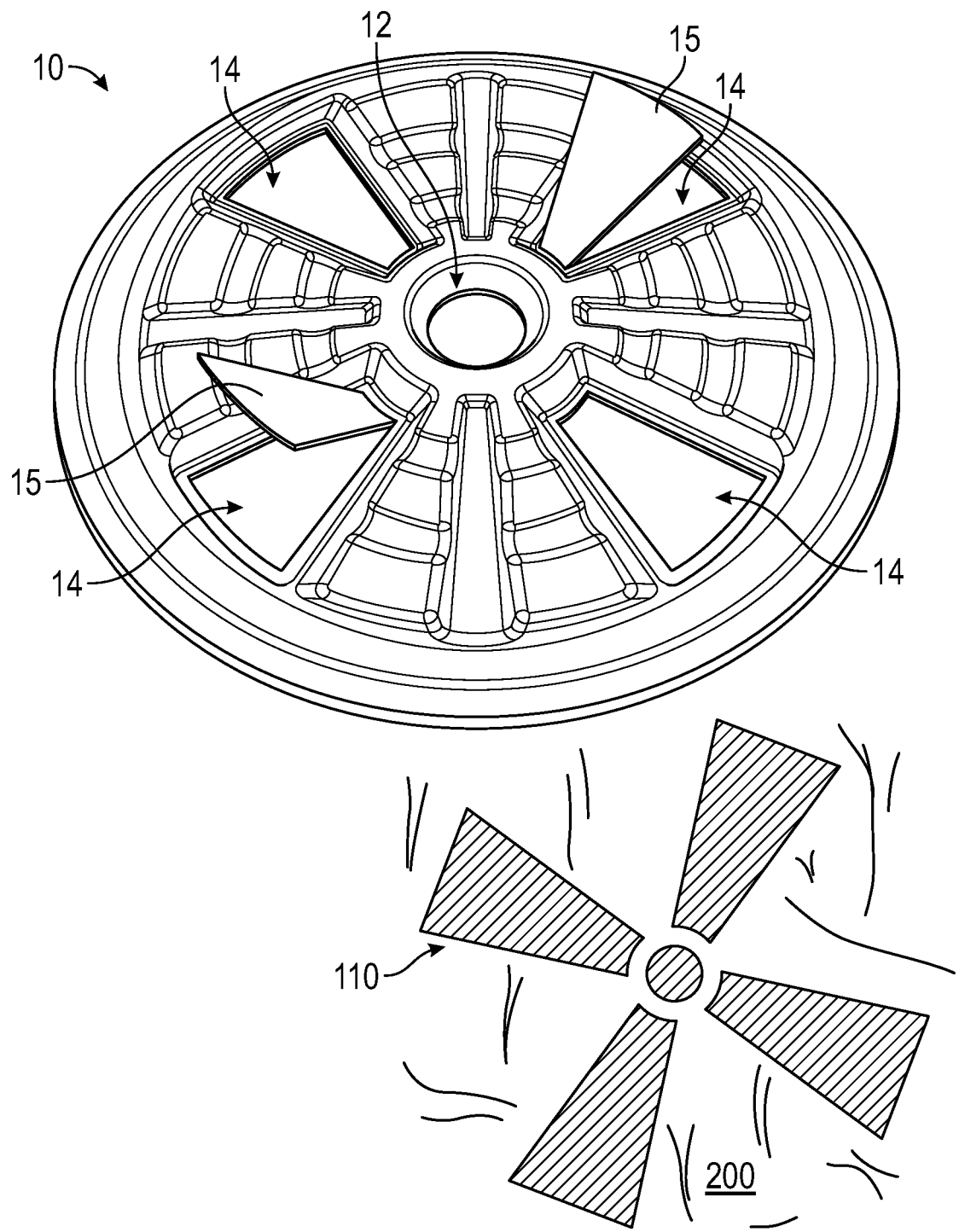
FIG. 5 is a perspective top view of a ground control target with three of four cut away sections removed from the target and the fourth partially removed to create a stencil with a handle for the user with a painted target made with the stencil located on a ground surface below according to an embodiment of the present invention.

As shown in FIG. 5, the ground control target 10 can be modified by removing the floors or bottoms of the various depressed portions 12 & 14 to create a stencil. In some circumstances, it may be desirable to remove the cutouts of all the depressed portions, or as shown in FIG. 5, a user can leave the innermost edges of opposing depressed annulus sector portions to create two flaps 15 that when folded towards each other create a handle that can be held in one hand by a user to position the template while spray painting the target with the other hand. When the painting is complete the user need only lift the template upwardly to remove it with reduced risk of smearing the still wet paint.

FIG. 5 shows a painted target 110 shown on a ground surface 200.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A ground control target comprising biodegradable materials, the ground control target being substantially circular and having:
   a center point configured to receive a stake therethrough; and
   three or more evenly circumferentially-spaced radially-extending depressions collectively surrounding the center point;
   wherein each of the three or more evenly circumferentially-spaced radially-extending depressions include at least one of scoring and perforations along a perimeter of the radially-extending depression.

2. The ground control target of claim 1, wherein the biodegradable materials substantially comprise a paper pulp.

3. The ground control target of claim 1, comprising four evenly circumferentially-spaced radially-extending depressions of the three or more evenly circumferentially-spaced radially-extending depressions.

4. The ground control target of claim 1 further including a center depression surrounding the center point.

5. The ground control target of claim 4 wherein the second, third and fourth depressions are shaped as annulus sectors.

6. A method for using the ground control target of claim 1, the method comprising:
   placing the ground control target on a ground surface;
   securing the ground control target in place by driving the stake through the center point; and
   determining the GPS coordinates of the center point.

7. The method of claim 6 further comprising:
   mapping the ground surrounding the ground control target using the GPS coordinates as a reference;
   leaving the ground control target in the ground surface to biodegrade.

8. A method for using the ground control target of claim 1, the method comprising:
   at least partially removing portions of the ground control target comprising the three or more evenly circumferentially-spaced radially-extending depressions by tearing each portion along the at least one of scoring and perforations;
   placing the ground control target over a ground surface at a desired location; and
   using the ground control target as a stencil, spray painting over the ground control target to create a painted target.

9. The method of claim 8 further comprising:
   determining the GPS coordinates of the center point of the painted target; and
   mapping the ground surrounding the ground control target using the GPS coordinates as a reference.

10. A combination comprising the ground control target of claim 1 and a biodegradable plastic stake, the plastic stake having a head portion and a shaft portion extending downwardly from a bottom side of the head.

11. The combination of claim 10, wherein the head includes a head indentation on a top side, the head indentation being configured to receive the distal end of a surveying rod therein.

12. The combination of claim 10, wherein the head portion has a diameter of at least 1" and has a surface that is contrasting in color relative to the ground control target.

13. The combination of claim 10, wherein the shaft tapers from a larger first width proximate the bottom side of the head to a smaller second width proximate a distal end thereof.

14. The combination of claim 13, wherein the shaft has a plus sign-shaped cross section.

15. A combination comprising:
   a plurality of single unitary piece ground control targets, each ground control target comprising biodegradable materials, each ground control target having a center point and being surrounded by a plurality of evenly circumferentially-spaced radially-extending depressions bordered by raised portions, wherein each depression of the plurality of evenly circumferentially-spaced radially-extending depressions include at least one of scoring and perforations along a perimeter of the depression;
   a plurality of fastening stakes, each fastening stake having a head and a shaft extending from the head and being configured to be received through the center point of a ground control target of the plurality of single unitary piece ground control targets;
   a storage box, the storage box including (i) four substantially vertical sides, a substantially horizontal bottom side and a substantially horizontal top side, (ii) a first cutout portion on the top side configured as a handle, and (ii) a second cutout on one or more vertical sides of the four substantially vertical sides configured to facilitate removal of ground control targets from the storage box through the second cutout, the second cutout including a closable flap;

wherein the plurality of single unitary piece ground control targets are stacked substantially vertically within the storage box and wherein the shaft of each stake of the plurality of stakes are received in the box through at least one side of the four substantially vertical sides with the head abutting an outside surface of the at least one side.

16. The combination of claim 15, wherein the closable flap is connected to the one or more vertical sides along a roughly diagonal edge of the second cutout.

\* \* \* \* \*